United States Patent
Wang et al.

(10) Patent No.: US 12,090,910 B2
(45) Date of Patent: Sep. 17, 2024

(54) EMERGENCY SUPPORT ROBOT FOR POLAR UAVS

(71) Applicant: Taiyuan University Of Technology, Taiyuan (CN)

(72) Inventors: Tao Wang, Taiyuan (CN); Jinzhu Zhang, Taiyuan (CN); Wei Shi, Taiyuan (CN); Hanqing Shi, Taiyuan (CN); Xiaoxiong Ma, Taiyuan (CN); Qinkang Sun, Taiyuan (CN); Caiyun Zhao, Taiyuan (CN); Xiaoyan Xiong, Taiyuan (CN); Hefeng Wang, Taiyuan (CN); Zhongkai Ren, Taiyuan (CN); Xiaobao Ma, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 198 days.

(21) Appl. No.: 17/421,109

(22) PCT Filed: Oct. 20, 2020

(86) PCT No.: PCT/CN2020/122101
§ 371 (c)(1),
(2) Date: Jul. 7, 2021

(87) PCT Pub. No.: WO2021/129081
PCT Pub. Date: Jul. 1, 2021

(65) Prior Publication Data
US 2022/0314864 A1    Oct. 6, 2022

(30) Foreign Application Priority Data

Dec. 23, 2019 (CN) .......................... 201911338658.2

(51) Int. Cl.
*B60P 3/11* (2006.01)
*B62D 55/065* (2006.01)
(Continued)

(52) U.S. Cl.
CPC .............. *B60P 3/11* (2013.01); *B62D 55/065* (2013.01); *B64F 1/027* (2020.01); *B64F 1/06* (2013.01);
(Continued)

(58) Field of Classification Search
CPC .......... B60P 3/11; B62D 55/065; B64F 1/027; B64F 1/06; B64F 1/02; B64C 39/024;
(Continued)

(56) References Cited

U.S. PATENT DOCUMENTS 9,403,566 B2 * 8/2016 Jacobsen ................ B62D 37/04
10,945,902 B2 * 3/2021 Paul ....................... A61G 7/012
(Continued)

FOREIGN PATENT DOCUMENTS

CN      102200412       9/2011
CN      105109685       12/2015
(Continued)

*Primary Examiner* — Tony H Winner
*Assistant Examiner* — Marlon A Arce
(74) *Attorney, Agent, or Firm* — Piloff Passino & Cosenza LLP; Rachel K. Piloff; Sean A. Passino

(57) ABSTRACT

The invention relates to an emergency support robot for polar UAVs, belonging to the technical field of emergency support robots for polar UAVs. The technical problem to be solved is to improve the structure of the existing emergency support robots for polar UAVs. The technical scheme adopted is as follows: the robot is of a car body structure; a support table is arranged on the upper side of the chassis of the car body; a traveling mechanism is arranged on both sides of the chassis of the car body; the two sides of the support table are hinged with a pair of casings through hinged buckles and push rods; the casings are also provided with a wind power plant; the support table is provided with a launching guide rail.

9 Claims, 6 Drawing Sheets

(51) Int. Cl.
*B64F 1/02* (2006.01)
*B64F 1/06* (2006.01)
*B64C 39/02* (2023.01)
*B64U 70/30* (2023.01)
*B64U 70/70* (2023.01)
*B64U 80/86* (2023.01)

(52) U.S. Cl.
CPC ............ *B64C 39/024* (2013.01); *B64U 70/30* (2023.01); *B64U 70/70* (2023.01); *B64U 80/86* (2023.01)

(58) Field of Classification Search
CPC ........ B64U 70/30; B64U 70/70; B64U 80/86; B64U 50/38; B64U 70/93; B64U 70/99; H02J 50/10
See application file for complete search history.

(56) References Cited

U.S. PATENT DOCUMENTS

| | | | | |
|---|---|---|---|---|
| 11,389,348 | B2* | 7/2022 | Patmore | A61G 1/0275 |
| 2015/0059100 | A1* | 3/2015 | Brubaker | A61G 7/05738 |
| | | | | 5/713 |
| 2019/0261566 | A1* | 8/2019 | Robertson | A01D 46/30 |
| 2021/0345977 | A1* | 11/2021 | Kumar | B60B 19/003 |
| 2021/0353482 | A1* | 11/2021 | Bardo | A61G 10/005 |

FOREIGN PATENT DOCUMENTS

| | | |
|---|---|---|
| CN | 108190042 | 6/2018 |
| CN | 209388479 | 9/2019 |
| CN | 209738910 | 12/2019 |
| CN | 110963065 | 4/2020 |

* cited by examiner

EMERGENCY SUPPORT ROBOT FOR POLAR UAVS

FIELD OF THE INVENTION

The invention relates to an emergency support robot for polar UAVs, belonging to the technical field of emergency support robots for polar UAVs.

BACKGROUND OF THE INVENTION

With the development of modern science and technology, robots are used more and more widely. A robot is a mechanical device that automatically performs its work. It can act according to human commands, pre-programmed programs, and principles developed with artificial intelligence technology. Its task is to assist or replace humans in jobs such as manufacturing, construction, or dangerous work. As another example, due to the complex terrain and harsh climate conditions in the polar regions, robots are required to have stable and efficient performance to replace human beings in work.

Emergency support robots are important equipment to cooperate with human to complete polar expedition. At present, relevant scientific research activities in the polar regions require UAVs to explore relevant areas. Recovering, recharging and launching UAVs are necessary steps in using UAVs. Launching of UAVs directly affects the reliability, maneuverability, regional adaptability and survivability of UAV systems, thus it is the most difficult and critical part in the application of UAVs.

There are many ways to recover UAVs. However, due to the special environment in the polar regions, safe and reliable recovery of UAVs has become an important index for performance evaluation. At present, most of recovery, recharging and launching devices of UAVs are independent individual units, resulting in low recovery and recharging efficiency and long launching cycle of UAVs. The whole process requires manual auxiliary operation in the field, which is characterized by high working intensity, high cost and low degree of automation, resulting in low efficiency of UAV support work.

SUMMARY OF THE INVENTION

In order to overcome these defects in the prior art, the invention provides an improvement of the structure of an emergency support robot for polar UAVs.

The technical solution of the invention is as follows: An emergency support robot for polar UAVs, the robot is of a car body structure, a support table is arranged on the upper side of the chassis of the car body, a traveling mechanism is arranged on both sides of the chassis of the car body; the two sides of the support table are hinged with a pair of casings through a hinged buckle and a push rod; the casings are also provided with a wind power plant;

The support table is provided with a launching guide rail. The front end of the launching guide rail is provided with a lifting device, the middle part is provided with an arresting device, and the rear part is provided with an ejection device.

The launching guide rail is also provided with a pneumatic chuck and a clamping device.

The support table is also provided with a control circuit board, which is integrated with a microcontroller. The microcontroller is used to control the power communication system of the whole robot.

The lifting device comprises a front bracket; the front bracket is a C-shaped structure, and the two ends of the front bracket are hinged with a pair of balance bars, which is welded with a lifting rod. The lifting rod is arranged vertically with the support table. A pair of cylinder push rods is arranged on both sides of the front bracket, and the fixed ends of the cylinder push rods are hinged with the lifting rod.

The arresting device is arranged on the lower side of the launching guide rail. The arresting device comprises a pair of arresting net vertical rods, a pair of arresting net connecting rods, a pair of draw-in bars, a pair of supporting slide rods and a pair of bases. An arresting net is arranged between the arresting net vertical rods. The middle parts of the arresting net vertical rods are hinged with the bases, and the free ends of the arresting net vertical rods are hinged with one end of the arresting net connecting rods. The other end of the arresting net connecting rods is hinged with one end of the supporting slide rods and the draw-in bars, and the other end of the draw-in bar is connected with the lifting cylinder. And the lifting cylinder is arranged vertically with the support table.

The pneumatic chuck comprises a chuck groove. The chuck groove is arranged on the lifting cylinder. The lifting cylinder is arranged on the chuck base. The chuck base is arranged on the sliding rail.

The bottom of one side of the chuck groove is hinged with the chuck base through a connecting rod.

The clamping device comprises a UAV holder. The middle part of the UAV holder is provided with an ejector rack sliding vane. The ejector rack sliding vane is provided with a rectangular gripper. A pair of spring connecting rod chutes is arranged in parallel at the front and rear ends of the rectangular gripper. A pair of movable spring connecting rods is arranged between the spring connecting rod chutes. The middle part of the spring connecting rod is hinged with a reset spring. The two sides of the reset spring are respectively provided with a pair of Y-shaped jaw plates. The jaw plates are hinged with each other through a connecting shaft. One end of the jaw plates is connected in series on the spring connecting rod, and the other end of the jaw plates is provided with a rubber head.

The ejection device comprises an ejector rack. The inner side of the ejector rack is provided with a pair of booster cylinders. The free end of the booster cylinder is connected with the sliding block arranged horizontally, and the two ends of the sliding block are arranged in the ejector rack rail chute. The sliding block is also hinged with one end of the scissor type expansion bracket. The other end of the scissor type expansion bracket is provided with a pushing block. The pushing block slides on the inner groove of the launching guide rail.

The traveling mechanism comprises a plurality of crawler wheels, which are connected through supporting rods. Crawlers are arranged on the outside of the crawler wheels. An air adaptive suspension spring is also arranged between the supporting rods.

The arresting net is a cold-resistant nylon plastic net.

The chuck groove is arranged with a low temperature resistant polyurethane vacuum pneumatic chuck.

The front end of the support table is also provided with a camera and a RTK device.

The upper part of the crawler is also provided with a fender, and the upper part of the fender is provided with a solar panel.

Compared with the prior art, the invention has the following beneficial effects: aiming at the harsh environment in the polar regions, the invention provides an emergency support robot for guided recovery and assisted ejection of polar UAVs in order to guarantee the smooth development of polar UAV exploration and scientific expedition. The robot is provided with a special guide rail, which can be used to launch UAVs, together with the lifting and ejection devices. With the positioning module on the robot, the UAVs in operation are guided to land and fall into the internal arresting net. The whole process requires no human intervention, which effectively improves the efficiency of the UAVs in the polar regions and reduces the working intensity and maintenance cost.

BRIEF DESCRIPTION OF THE FIGURES

The invention is further explained below in combination with the accompanying drawings.

In the figure, 1 is a support table, 2 is a traveling mechanism, 3 is a hinged buckle, 4 is a push rod, 5 is a casing, 6 is a wind power plant, 7 is a launching guide rail, 8 is a lifting device, 9 is an arresting device, and 10 is an ejection device, 11 is a pneumatic chuck, 12 is a clamping device, 13 is a front bracket, 14 is a balance bar, 15 is a lifting bar, 16 is a cylinder push bar, 17 is an arresting net vertical rod, 18 is an arresting net connecting rod, 19 is a draw-in bar, 20 is a support slide rod, 21 is a base, 22 is an arresting net, 23 is a lifting cylinder, 24 is a chuck groove, 25 is a lifting cylinder, 26 is a chuck base, 27 is a sliding rail, 28 is a UAV holder, 29 is an ejector rack sliding vane, 30 is a rectangular gripper, 31 is a spring connecting rod chute, 32 is a spring connecting rod, 33 is a reset spring, 34 is a jaw plate, 35 is a connecting shaft, 36 is a rubber head, 37 is an ejector rack, 38 is a booster cylinder, 39 is a sliding block, 40 is an ejector rack rail chute, 41 is a scissor type expansion bracket, 42 is a pushing block, 43 is a crawler wheel, 44 is a supporting rod, 45 is a crawler, 46 is an air adaptive suspension spring, 47 is a camera, 48 is a RTK device, 49 is a fender and 50 is a solar panel.

DESCRIPTION OF THE INVENTION

Figure 1:
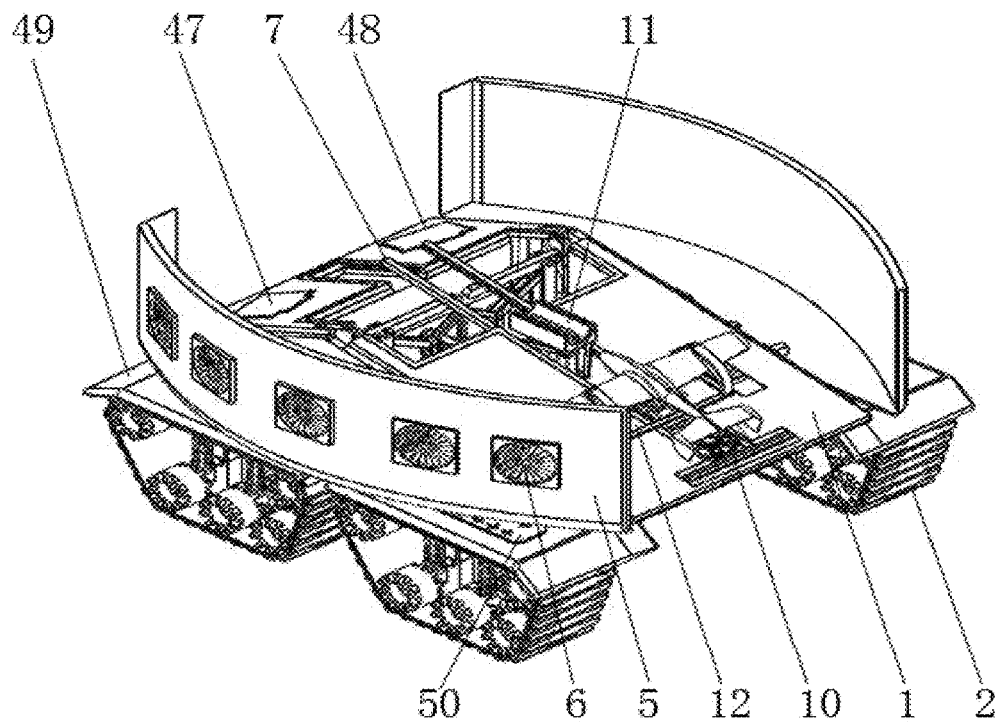
FIG. 1 is a structural diagram of the invention.
Figure 2:
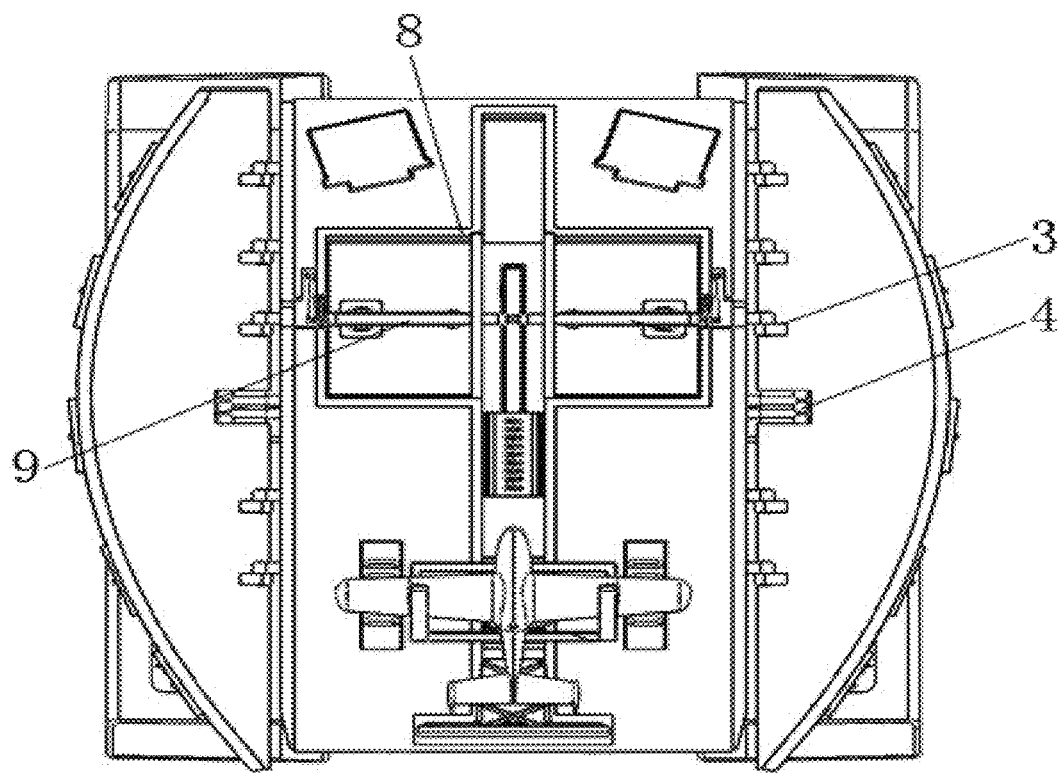
FIG. 2 is a top view of FIG. 1.
Figure 3:
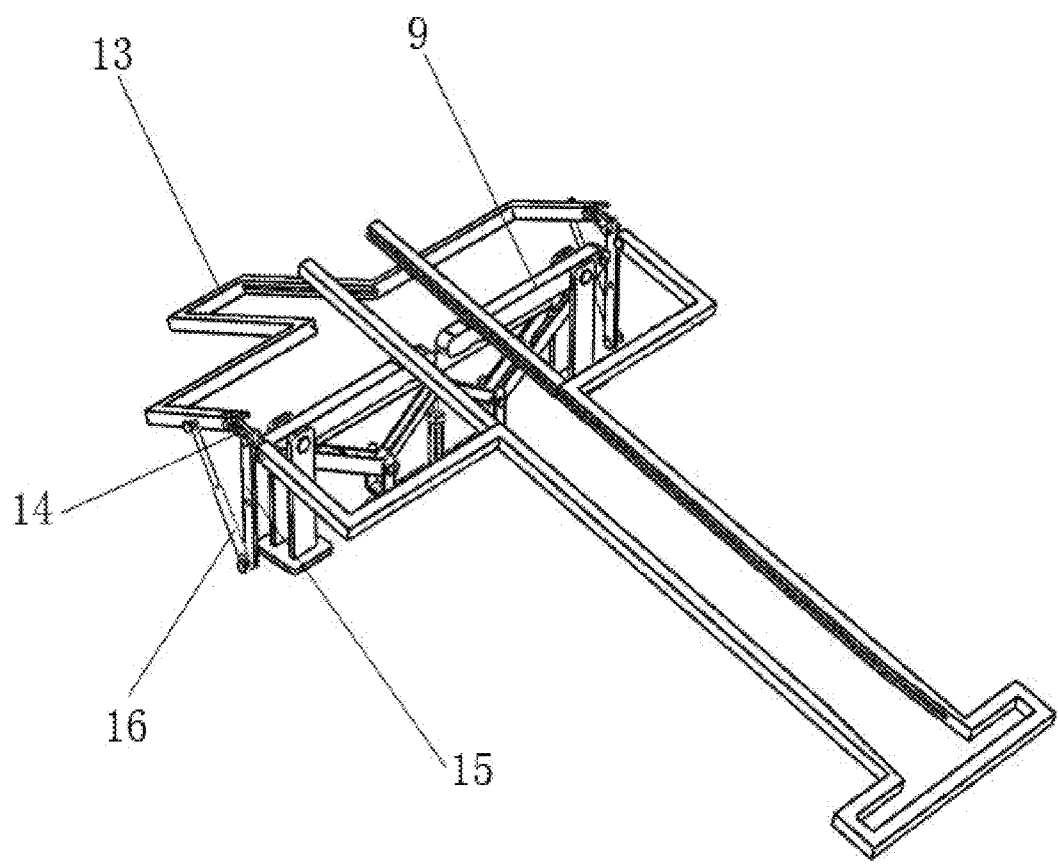
FIG. 3 is a structural diagram of the lifting device of the invention.
Figure 4:
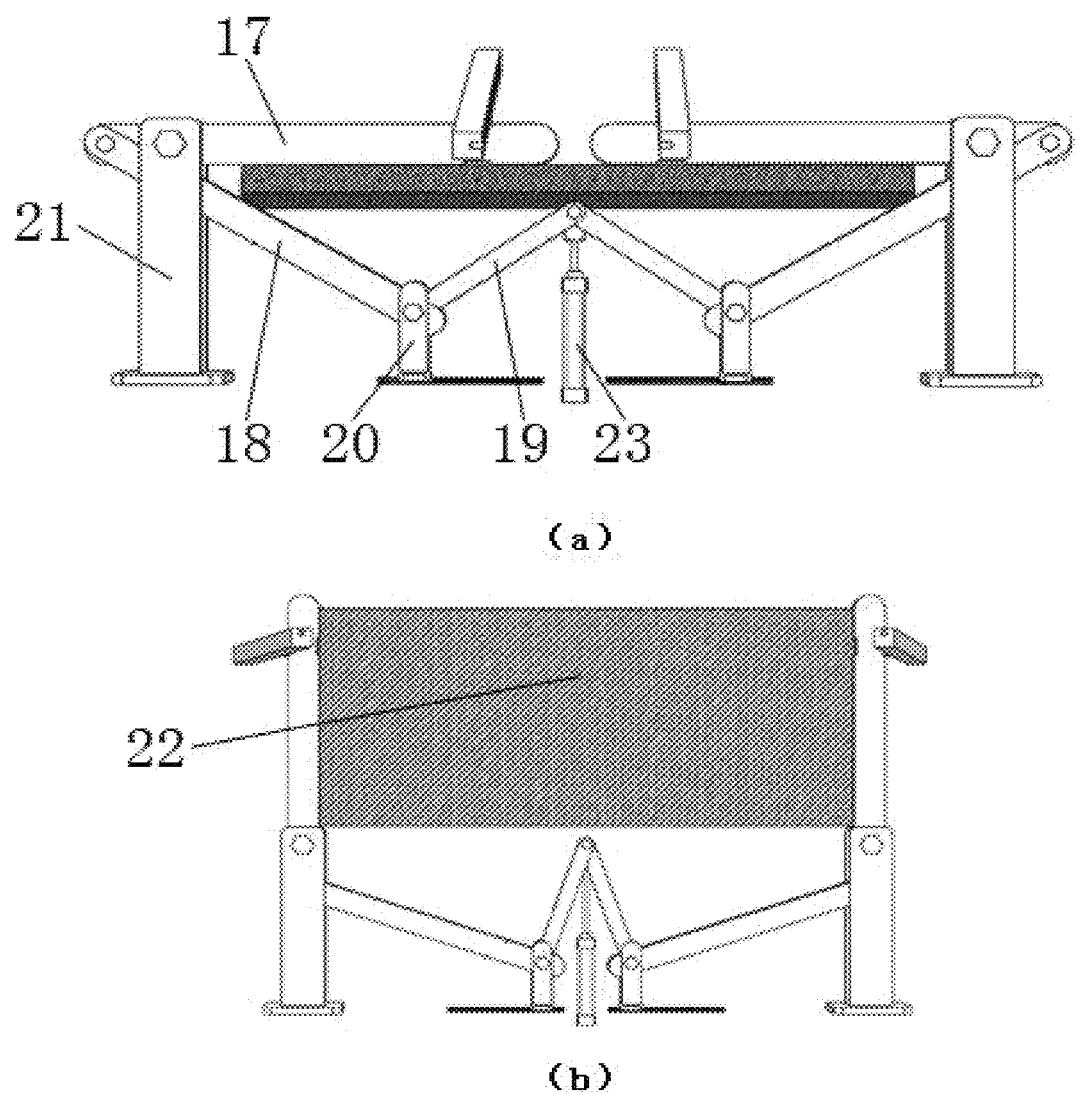
FIG. 4 is a structural diagram of the arresting device of the invention.
Figure 5:
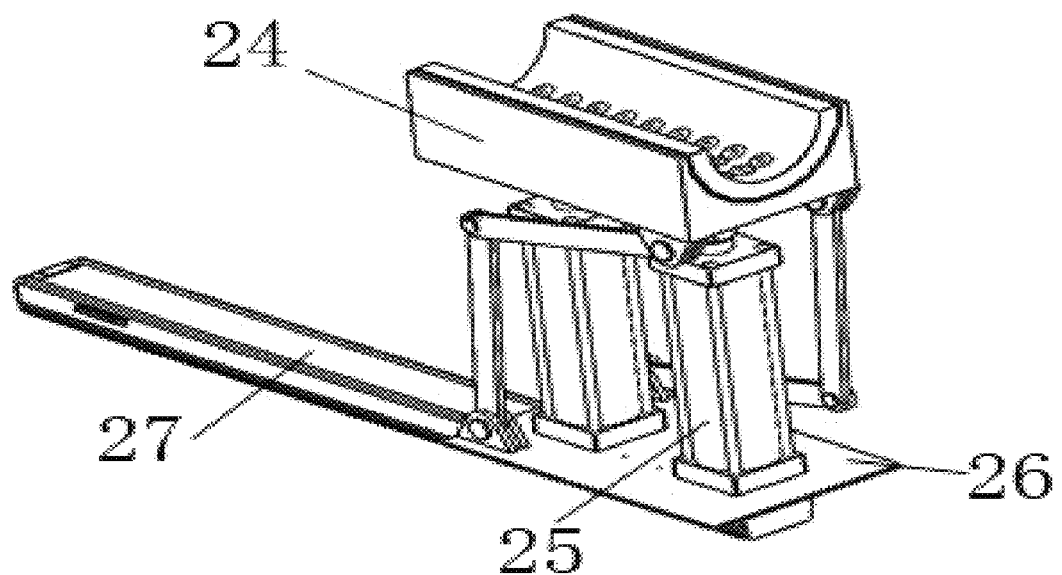
FIG. 5 is a structural diagram of the pneumatic chuck of the invention.
Figure 6:
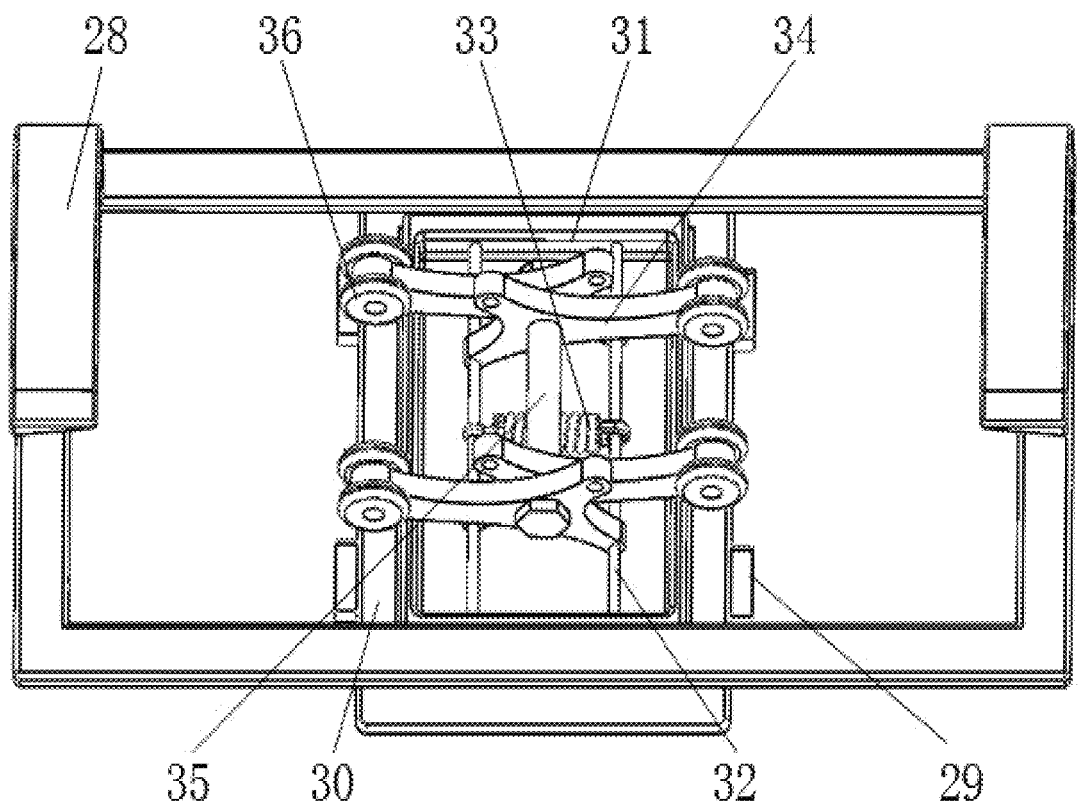
FIG. 6 is a structural diagram of the clamping device of the invention.
Figure 7:
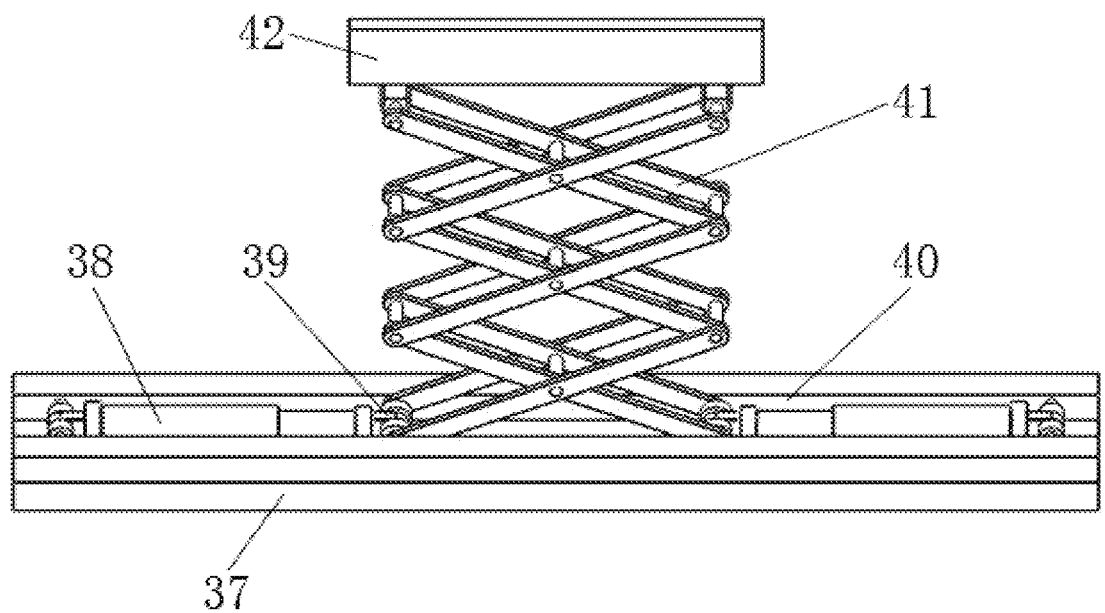
FIG. 7 is a structural diagram of the ejection device of the invention.
Figure 8:
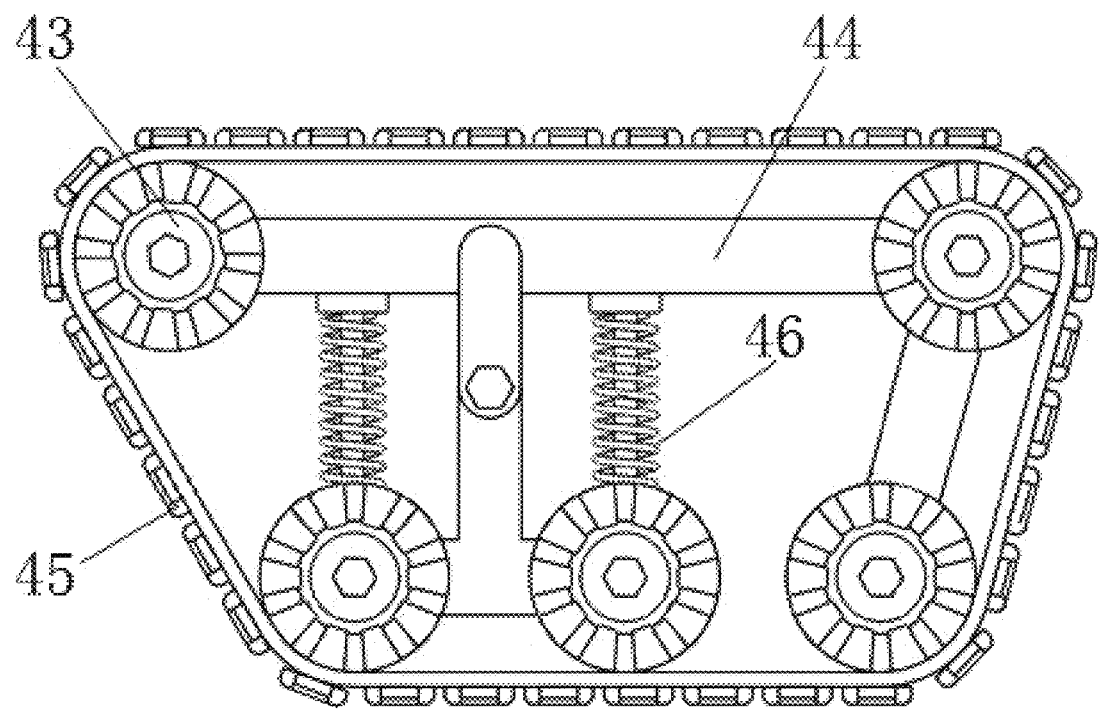
FIG. 8 is a structural diagram of the traveling mechanism of the invention.
Figure 9:
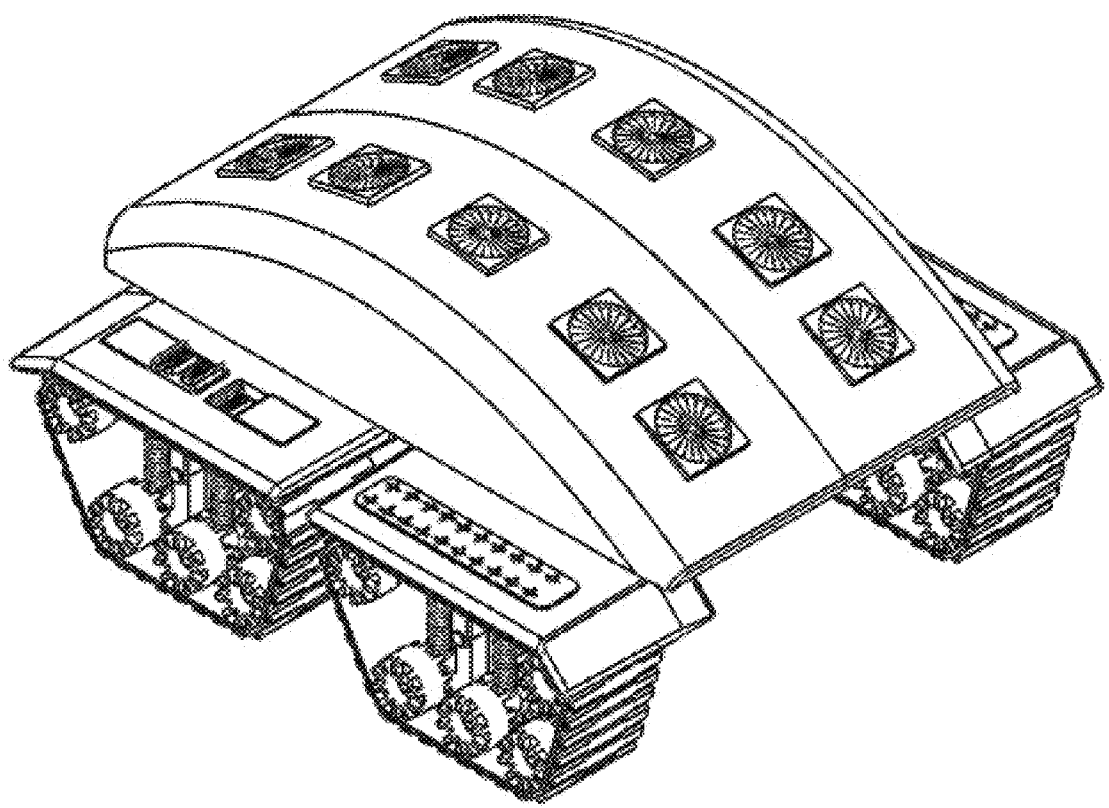
FIG. 9 is a reference diagram of the present invention in use.

As shown in FIG. 1 to FIG. 9, the invention relates to an emergency support robot for polar UAVs, with a chassis. With a support table, the chassis is connected with a launching guide rail through the support table, wherein, the support table is provided with a launching guide rail, an arresting net recovery device, a pneumatic chuck and a charging device, a clamping device and an ejection device. The pneumatic chuck and the charging device can slide on the support table, and can be lifted and landed in the vertical direction, and the pneumatic chuck device works by pneumatic transmission through the lifting cylinder; the arresting net recovery device is located in the middle part of the support table and is composed of arresting nets and their vertical rods. The outside of the vertical rods is welded with the middle part of the launching guide rail. The clamping device comprises four triangular jaw plates hinged in pairs and a UAV holder. There are round openings in the bottom and middle of the triangular jaw plates, which are clamped adaptively by the weight of the UAV in a hinged way. The ejection device comprises a scissor-type expansion bracket, a left and a right sliding block and a booster cylinder, which can eject the UAV.

The UAV arresting net comprises a supporting mechanism, a rotating mechanism, an angle adjusting mechanism and an arresting net. The first supporting arresting net vertical rod is hinged with the first base on the support table. The first supporting vertical rod is welded with the middle part of the first launching guide rail, and the second supporting vertical rod is hinged with the second base on the support table. The second supporting vertical rod is welded with the middle part of the second launching guide rail. The lifting cylinder is fixed on the support table, and the top is hinged with the first inclined draw-in bar and the second draw-in bar (symmetrical). The first connecting rod is hinged to the first draw-in bar and the supporting slide rod, and the second connecting rod (symmetrical) is hinged to the second draw-in bar (symmetrical) and the supporting slide rod (symmetrical).

The first launching rail is arranged in the front end of the support table. The middle part of the platform is protruded. The first cylinder installed on the left side is hinged with the first connecting rod, and the first connecting rod is hinged with the balance bar. The second cylinder (symmetrical) mounted on the right is hinged to the second connecting rod (symmetrical). The second connecting rod (symmetrical) is hinged to the balance bar (symmetrical), and the front end of the rail is pushed up by the first cylinder and the second cylinder (symmetrical).

The pneumatic chuck is hinged with the first cylinder and the second cylinder. The lower left side of the pneumatic chuck is hinged with two connecting rods. The connecting rods are hinged with the supporting base, and the lower right side of the pneumatic chuck is hinged with two connecting rods (symmetrical). The connecting rods (symmetrical) are hinged to the supporting bases (symmetrical). The supporting bases with the pneumatic chuck and the charging device (posture adjustment) slide on the rail.

The clamping device comprises a triangular jaw plate, a reset spring, a jaw plate connecting shaft and a spring connecting rod. The first triangular jaw plate is hinged with the second triangular jaw plate; the third triangular jaw plate is hinged with the fourth triangular jaw plate, and the hinges are connected by the jaw plate connecting shaft. The bottom end of the triangular jaw plate is connected by a spring connecting rod and slides in the sliding groove of the spring connecting rod. The head of the triangular jaw plate is equipped with a rubber head, and UAVs are towed by UAV holders comprising arc plates welded with rectangular frames.

The ejection device comprises an ejecting block, a scissor type expansion bracket, a sliding block, and a booster cylinder. The two front ends of the scissor type expansion bracket are hinged with the ejecting block. The ejecting block slides in the groove inside the launching rail, and the back ends are respectively connected with the first sliding block and the second sliding block (symmetrical). The first sliding block is hinged with the first booster cylinder. The second sliding block (symmetrical) is hinged with the second booster cylinder (symmetrical). The first sliding block and the second sliding block (symmetrical) slide in the chute of the cylinder boosting rail.

The traveling mechanism comprises a crawler wheel, a supporting connecting rod, a crawler and an air-adaptive suspension spring. The rear drive of the crawler wheel and the four-point air adaptive suspension spring are subject to self-adaptive balancing according to the ground conditions.

The arresting net is made of cold-resistant nylon plastic.

The pneumatic chuck is a low temperature resistant polyurethane vacuum pneumatic chuck.

The charging system is an intelligent wireless charging system with an electric field coupling array, and the electric field is arranged around the pneumatic chuck.

The power generator is a wind-driven generator.

The support robot provided by the invention is specifically used for the operation and maintenance of UAVs and can automatically change its shape according to different working modes. It realizes the automatic lifting of the arresting unit, the shape change of the launching rail, the automatic clamping of the ejector rack and automatic opening & closing and shape change of the robot cover.

The control and posture adjustment device equipped with the robot adopts a low-temperature resistant polyurethane vacuum pneumatic chuck, which can realize the control and posture adjustment of UAVs. The charging system adopts electric field coupling array intelligent wireless induction charging, which realizes the function technology upgrade from wire charging to wireless charging.

Through the signal transmission between the UAV, GPS and the reference station, the robot realizes the accurate recovery of UAVs equipped with a RTK device, which effectively improves the accuracy and efficiency of the UAV recovery.

The robot uses the pneumatic transmission to boost the scissor type expansion bracket, which can launch the ejector rack carrying the UAV, and help the UAV to reach the maximum instantaneous take-off speed by means of inertia to ensure the UAV's go-around.

In addition, the robot provided by the invention is equipped with a wind-driven generator, which can store wind energy in the lead battery when undergoing wild wind in the polar region, so as to ensure the UAV charging and the normal operation of other energy consuming components.

The specific steps for using the present invention are as follows:

During the UAV recovery: the UAV with a RTK device communicates with GPS (Global Positioning System, or the Beidou Navigation Satellite System) and robot reference stations (emergency support robot for polar UAVs) to realize three-wire signal transmission, so that the UAV can receive the guidance signal for recovery in real time, and finally an accurate guided recovery of the UAV can be realized;

The signal receiver on the UAV receives the recovery signal, and the robot and the UAV move in the same direction through signal transmission. When the UAV enters the landing state, the robot stops moving, and then the arresting net on the robot platform jacks up the draw-in bar through the lifting cylinder at the bottom of the arresting net bracket, making the net instantly expand to wait for the UAV to hit the arresting net. At this time, the UAV posture adjustment mechanism with a low-temperature resistant polyurethane vacuum pneumatic chuck on the robot platform rises in the vertical direction through the lifting cylinder. After the UAV hits the net, the control and posture adjustment of the UAV can be realized by using the suction force of the vacuum pneumatic chuck.

While charging the UAV: after the UAV posture adjustment mechanism with a low-temperature resistant polyurethane vacuum pneumatic chuck controls the UAV through suction of the chuck, the sensor signal receiver on it receives the signal and triggers the switch of the charging device to start.

When the UAV power is full, the power sensor will cut off the vacuum pneumatic chuck after receiving the signal, and the UAV posture adjustment mechanism is in an unconstrained state. At this point, the posture adjustment mechanism slowly descends and moves backward through the vertical lifting cylinder. During the descent process, the UAV slides down to the holder of the robot platform by self-balancing.

During the ejection of the UAV: the UAV balances itself by sliding onto a holder on the robotic platform, which is equipped with a scissor type adaptive clamping device. When the UAV slides down to the holder by its own weight, the scissor self-adaptive clamping device can clamp and balance the UAV on the holder.

The end of the launching rail of the robot platform is provided with a scissor expansion bracket, which is equipped with a scissor self-adaptive clamping device. The expansion bracket is compressed due to the gravity of the holder. After the built-in gravity sensor of the pushing block on the head of the scissor expansion bracket receives the ejection signal, the booster cylinder on both sides of the robot rail releases pressure and pushes the sliding block connected by the cylinder to slide rapidly from both sides to the middle at the same time. The scissor expansion bracket is squeezed instantaneously and releases the elastic thrust rapidly, which makes the pushing block at the head of the scissor expansion bracket accelerates to the forward direction of the UAV. After a certain period of time, the holder equipped with the scissor self-adaptive clamping device reaches the front end of the rail. At this time, due to the high instantaneous velocity, the UAV can immediately release the clamping, and finally complete the UAV's ejection and go-around.

Finally, the above embodiments are only for illustration and should not limit the use of this invention. Notwithstanding the detailed description of the invention by reference to each of the foregoing embodiments, it shall be understood by those skilled in the art that the technical scheme recorded in each of the foregoing embodiments may be modified or that some or all of its technical features may be equivalently substituted; such modifications or substitutions shall not detract the nature of the corresponding technical solutions from the scope of the technical solutions in the embodiments of the present invention.

The invention claimed is:

1. An emergency support robot for polar Unmanned Aerial Vehicles, wherein the robot is of a car body structure, a support table (1) is arranged on an upper side of a chassis of the car body, a traveling mechanism (2) is arranged on both sides of the chassis of the car body, the two sides of the support table (1) are hinged with a pair of casings (5) through hinged buckles (3) and push rods (4), the casings (5) are also provided with a wind-driven generator (6), the wind-driven generator is configured for storing wind energy to ensure Unmanned Aerial Vehicles charging;

the support table (1) is provided with a launching guide rail (7), a front end of the launching guide rail (7) is provided with a lifting device (8), a middle part is provided with an arresting device (9), and a rear part is provided with an ejection device (10);

the launching guide rail (7) is also provided with a pneumatic chuck (11) and a clamping device (12);

the support table (1) is also provided with a control circuit board, which is integrated with a microcontroller, the microcontroller is used to control a power communication system of a whole robot;

the clamping device (12) comprises a Unmanned Aerial Vehicle holder (28), a middle part of the Unmanned Aerial Vehicle holder (28) is provided with an ejector rack sliding vane (29), the ejector rack sliding vane (29) is provided with a rectangular gripper (30), a pair of spring connecting rod chutes (31) is arranged in parallel at front and rear ends of the rectangular gripper (30), a pair of movable spring connecting rods (32) is arranged between the spring connecting rod chutes (31), a middle part of the spring connecting rod (32) is hinged with a reset spring (33), two sides of the reset spring (33) are respectively provided with a pair of Y-shaped jaw plates (34), the jaw plates (34) are hinged with each other through a connecting shaft (35), one end of the jaw plates (34) is connected in series on the spring connecting rod (32), and an other end of the jaw plates (34) is provided with a rubber head (36).

2. An emergency support robot for polar Unmanned Aerial Vehicles, as defined in claim 1, wherein, the lifting device (8) comprises a front bracket (13), the front bracket (13) is a C-shaped structure, and two ends of the front bracket (13) are hinged with a pair of balance bars (14), which are welded with a lifting rod (15), the lifting rod (15) are arranged vertically with the support table (1), a pair of cylinder push rods (16) is arranged on both sides of the front bracket (13), and fixed ends of the cylinder push rods (16) are hinged with the lifting rods (15).

3. An emergency support robot for polar Unmanned Aerial Vehicles, as defined in claim 1, wherein, the arresting device (9) is arranged on a lower side of the launching guide rail (7), the arresting device (9) comprises a pair of arresting net vertical rods (17), a pair of arresting net connecting rods (18), a pair of draw-in bars (19), a pair of supporting slide rods (20) and a pair of bases (21), Anan arresting net (22) is arranged between the arresting net vertical rods (17), middle parts of the arresting net vertical rods (17) are hinged with the bases (21), and free ends of the arresting net vertical rods (17) are hinged with one end of the arresting net connecting rods (18), an other end of the arresting net connecting rods (18) is hinged with one end of the supporting slide rods (20) and the draw-in bars (19), and an other end of the draw-in bar (19) is connected with a lifting cylinder (23), and the lifting cylinder (23) is arranged vertically with the support table (1).

4. An emergency support robot for polar Unmanned Aerial Vehicles, as defined in claim 1, wherein, the pneumatic chuck (11) comprises a chuck groove (24), the chuck groove (24) is arranged on a lifting cylinder (25), the lifting cylinder (25) is arranged on a chuck base (26), the chuck base (26) is arranged on a sliding rail (27);

a bottom of one side of the chuck groove (24) is hinged with the chuck base (26) through a connecting rod.

5. An emergency support robot for polar Unmanned Aerial Vehicles, as defined in claim 1, wherein, the ejection device (10) comprises an ejector rack (37), an inner side of the ejector rack (37) is provided with a pair of booster cylinders (38), a free end of each of the booster cylinder (38) is connected with a sliding block (39) arranged horizontally, and two ends of the sliding block (39) are arranged in an ejector rack rail chute (40), the sliding block (39) is also hinged with one end of a scissor type expansion bracket (41), an other end of the scissor type expansion bracket (41) is provided with a pushing block (42), the pushing block (42) slides on an inner groove of the launching guide rail (7).

6. An emergency support robot for polar Unmanned Aerial Vehicles, as defined in claim 1, wherein, the traveling mechanism (2) comprises a plurality of crawler wheels (43), which are connected through supporting rods (44), crawlers (45) are arranged on an outside of the crawler wheels (43), an air adaptive suspension spring (46) is also arranged between the supporting rods (44).

7. An emergency support robot for polar Unmanned Aerial Vehicles, as defined in claim 3, wherein, the arresting net (22) is a cold-resistant nylon plastic net.

8. An emergency support robot for polar Unmanned Aerial Vehicles, as defined in claim 4, wherein, the chuck groove (24) is arranged with a low temperature resistant polyurethane vacuum pneumatic chuck.

9. An emergency support robot for polar Unmanned Aerial Vehicles, as defined in claim 7, wherein, a front end of the support table (1) is also provided with a camera (47) and a RTK device (48);

an upper part of the crawler (45) is also provided with a fender (49), and an upper part of the fender (49) is provided with a solar panel (50).

* * * * *